Jan. 25, 1949. A. SCHUPP 2,460,150
APPARATUS FOR THE COOLING OF HEATED OBJECTS
Filed Nov. 17, 1944 2 Sheets-Sheet 2
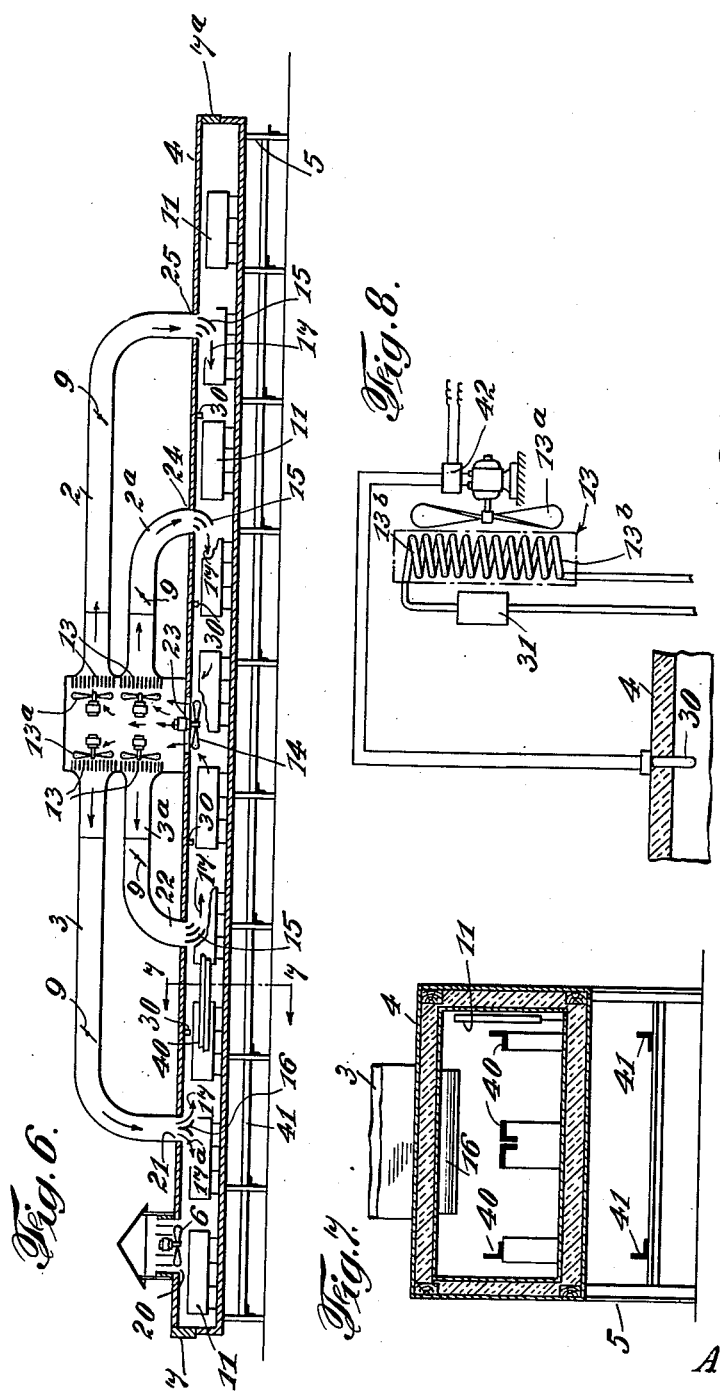
INVENTOR
*Arthur Schupp*
BY *C. P. Goepel*
his ATTORNEY Patented Jan. 25, 1949

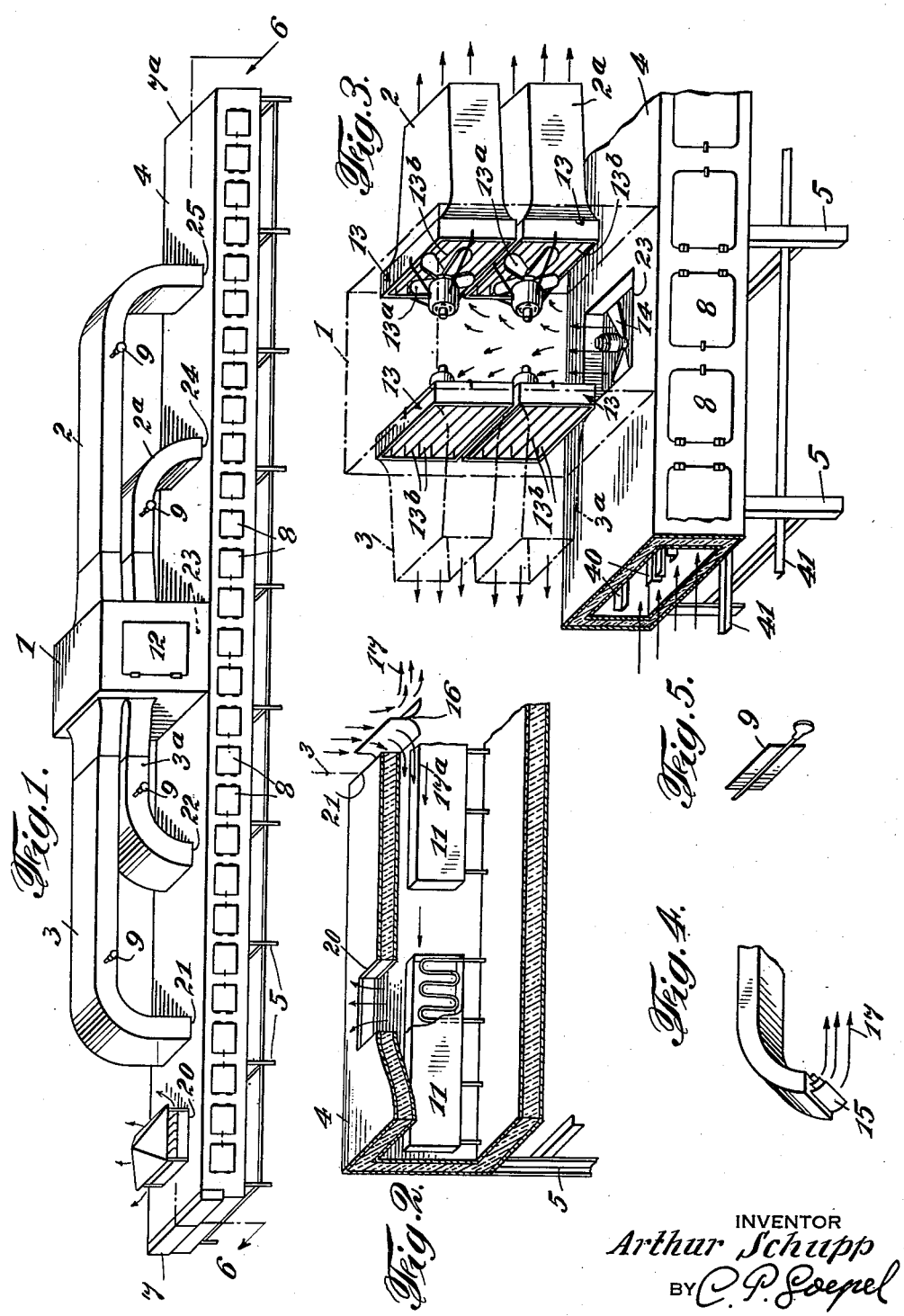

2,460,150

UNITED STATES PATENT OFFICE 2,460,150

APPARATUS FOR THE COOLING OF HEATED OBJECTS

Arthur Schupp, New York, N. Y.

Application November 17, 1944, Serial No. 563,934

8 Claims. (Cl. 62—102)

This invention has for its object to cool moulded chocolate or chocolate candy bars from a 90° F. temperature to an approximate 40 to 45° F. product temperature in an apparatus for the cooling of heated objects, and consists in the means for creating, circulating and maintaining a volume of cold dry air the constant application of which medium to a heated product is used to condition the same.

In creating the medium, the factors of heat, humidity, temperature and circulation enter, and the conditioned medium wraps the product in a continuous blanket.

More particularly, the means proposed provide an extraction of moisture from the air; a cooling of the air; a blanket flow of the conditioned air over the product being treated, and a continuous movement of the medium.

The invention includes also a novel method which consists in subjecting the heated product to cold dry air at a certain temperature and humidity, in the form of a blanket, enwrapping the product, for removing the heat of the product.

The invention will be further described, embodiments thereof shown in the drawings, and the invention will be finally pointed out in the claims.

In the accompanying drawings,

Fig. 1 is a perspective view of the improved apparatus;

Fig. 2 is a fragmentary sectional perspective view of the entrance end of the tunnel;

Fig. 3 is a fragmentary perspective view of the suction, blowing and cooling means;

Fig. 4 is a perspective view of a deflector;

Fig. 5 is a perspective view of a damper;

Fig. 6 is a vertical longitudinal section of the apparatus shown in Figure 1;

Fig. 7 is a vertical transverse section of Fig. 6, taken on line 7—7 of Fig. 6;

Fig. 8 is a diagram of the temperature controls, and

Fig. 9 is a diagram showing the underlying principles of the invention.

Similar characters of reference indicate corresponding parts throughout the various views.

Referring to the drawings, an insulated conduit or tunnel 4 is suitably supported by standards 5. It has on one side a plurality of inspection openings 8. It has an openable entrance 7, through which an apron or conveyor, as known, and not shown, enters at the end when the entrance 7 is open. Conveyor tracks 40 are provided for the incoming conveyor 40a, at the interior of the tunnel, and tracks 41 are provided at the exterior of the tunnel for the return movement of the conveyor. The apron or conveyor 40a supports chocolate filled molds or chocolate, and conveys them to the other or outlet end 7a of the conduit or tunnel. These tunnels are about 50 to 75 feet long. All these parts are well known.

The improvement consists in providing means for moving a medium consisting preferably of air of dry and cold character over the molds or chocolate to condition the same.

The tunnel 4 is provided with a plurality of openings preferably in its top wall. These openings are indicated by 20, 21, 22, 23, 24, and 25. Above the opening 23, an insulated housing 1 is provided which encloses four coolers 13, each consisting of refrigeration coils and fins, two coolers being superposed forming pairs, and the pairs being opposite to each other arranged longitudinally of the tunnel. These coolers 13 also each have an electrically driven blower 13a.

At the bottom of the housing, at the opening 23, a suction fan 14 is provided, which sucks air from the interior of the tunnel and discharges it into the housing 1. Here the air is taken up by the blowers 13a, and blown between cooling fins 13b, and into the ducts 3 and 3a, on one side of the housing, and into the ducts 2 and 2a, on the other side of the housing. The ducts have insulated walls and each is provided with an air control damper 9. The housing 1 is provided with doors 12, preferably at the front and rear for ready access to the interior.

The duct 3 communicates with the opening 21 and the duct 3a with the opening 22. The duct 2 communicates with the opening 25, and the duct 2a with the opening 24. At the openings 22, 24, and 25, the ducts 3a, 2 and 2a conduct the air against deflectors 15, which direct the air in the direction of the arrows 17, as shown. At the opening 21, a double deflector 16 directs the air in opposite directions as shown by the arrows 17 and 17a. The reason for the stream 17a is to direct a certain part of the air towards the opening 20, where an exhaust fan 6 is provided to drive out the air from the interior of the tunnel into the atmosphere. This opening 20 is arranged near the entrance end of the tunnel, where the incoming chocolates have the highest temperature. The incoming chocolate heated molds give up considerable heat and moisture at the entrance of the tunnel, and the product in the tunnel has about 90° F., and the heat is partly removed by the action of the exhaust fan 6, assisted by the deflected air stream 17a.

The other air streams 17 of the double deflector 16, cool the interior of the tunnel, and this cooling action with that of the air streams induced by the exhaust fan 14, bring the temperature in that part of the tunnel to about 35° F. Likewise, the entering air at the opening 22 acts with the induction action of the exhaust fan 14. The induced air acts in the same direction as the direction of movement of the molds or chocolate. The deflected air at the openings 25 and 24 is drawn in a direction opposite to the direction of movement of the molds or chocolates, so that in the embodiment shown the molds or chocolate are benefited by both movements of air over the same. After the molds or chocolate have moved through the tunnel, the temperature of the molds or the chocolate is reduced to 45° F. to 50° F., at the discharge end 7a of the tunnel, and the product has been conditioned.

Along one wall of the inside of the tunnel 4, a plurality of spaced refrigerated plate coils 11 are disposed. These are of known construction. As known, these plate coils include refrigeration tubes suitably supplied with a refrigerant, placed in an eutectic solution. These absorb in part the moisture content in the air of the interior of the tunnel 4, and these are spaced longitudinally along the interior of the tunnel from entrance to exit end. The humidity or moisture is regulated in part by the plate coils, and moisture deposits take place thereon, all along the interior of the tunnel.

The ducts 3, 3a, 2 and 2a, provide an efficient supply of the cooling medium or cold dry air in four circuits, in the preferred form.

The cooperation therewith of the suction fan 14 gives greater efficiency than if reliance be had only on such supply. In the embodiment, four circulation circuits are provided, and each circuit has regulated cold dry air.

Regulating means are provided to shut off the cooling action of the cooling coils, in the event the temperature in the tunnels goes below 35° F., and are gauged to operate at about 34° F. in the tunnel. These temperatures, as other temperatures are given by way of example and as applicable to the treatment of certain chocolate products. The temperatures naturally vary for other products. For this purpose, temperature controls 30 are provided which are connected with the fan motor switch 42, which starts the motor of the blowers 13a. In consequence, when the temperature of the air in the tunnel is reduced to about 34° F., thermostats, for example acting as temperature controls, cut out of operation the motor driven fan, thereby causing the expansion valve 31 to cut out the refrigerant of that system. Any moisture which has condensed on the coolers 13, is then melted by the warmer air, passing over the same and is suitably drained off. When the temperature in the tunnels reaches 40° F. for example, the temperature controls being correspondingly adjusted, the blowers are again set into operation. This causes the expansion valves to set the refrigeration mechanism into operation. Thereby, the air in the housing received from the suction fan 14, which operates continuously during the operation of the apparatus, is blown by the respective blowers against the respective coolers and into the respective ducts.

Any frozen moisture on the cooling plates 11, which operate at about 18° F., is usually removed after the day's operation by shutting off the flow of the refrigeration fluid therein. The action of these plates is continuous for the day's run. The action of the suction fans 14 and 6 is continuous for the day's run. The action of the coolers 13 and blowers therefor and the refrigerating mechanism of the coolers 13 is intermittent as described.

The apparatus described thus provides means to regulate the humidity (moisture) of the interior of the tunnel in which the objects to be treated pass through; also means to regulate the temperature in the interior of the tunnel, and also means to regulate the circulation of dry cold air in the tunnel. Also means are provided to regulate and provide air in the tunnel. Also, the gravity drop of the air or conditioning medium is availed of in the embodiment shown.

The product to be cooled in the embodiment shown moves in the same direction as the flow of the medium, but the velocity of the medium is faster than the velocity of the product. In the preferred form of the embodiment, the direction of the flow of the medium is also contrary to the direction of movement of the product, and in both movements of the medium, the medium acts under suction action upon the product, that is, under the action of the induced air created by the suction fan leading to the housing, and which pulls or sucks the medium from the interior of the tunnel to the housing. In the embodiments shown, the incoming medium of air enters under the action of gravity aiding the flow caused by the blowers, and the air drops, so to say, across the longitudinal flow of the product. It is here subjected to the induction action of the suction fan 14. Even with the deflectors shown, the cooler air drops and is taken up by the induction. A circulation takes place transversely in that the cooler air descends and the air supplied with heat by abstracting it from the product and its surrounding molds, and moving supports, ascends, and this is drawn away by the induced flow. Having suggested the induced flow and its beneficial actions, an alternative improvement may be the use of a pressure flow, and at spaced points in the interior of the tunnel, which would cool the product during its movement in the tunnel by abstracting heat and moisture, and with the moisture removed, the flow would impinge de-humified cool air upon the product. This would be a more expensive proceeding, and when dealing with air under pressure, it is like a vertical fountain jet, which loses its momentum after a certain distance, whereas induced air is substantially uniform in its flow action.

When a liquid evaporates and does not receive from without a quantity of heat equal to that which is expended in producing the vapor, its temperature sinks, and the cooling is greater in proportion as the evaporation is more rapid. The cooling effect produced by a wind or draught does not necessarily arise from the wind being cooler, but arises from the rapid evaporation it causes from the surface of the object being evaporated. The air flow under an induced action, provides a feeble pressure at the evaporation surface of the product, enabling the moisture of the product to evaporate quicker. As, however, it is desired also to abstract radiant heat from the chocolate molds or chocolate, that thermal exchange requires the air blanketing the same to have a lower temperature.

While there has been shown and described an apparatus for the cooling of chocolate molds or chocolates, the invention may be applied to other objects, with such changes in temperatures and humidity as may be necessary for such other objects.

There is provided a moving blanket of cold dehumidified air, which wraps around the product from the time the product enters the tunnel to the time the product leaves the tunnel at the desired temperature, whereby the product has been conditioned. The method then consists in subjecting the heated product to a medium of a dry cold character, in a continuous blanket envelopment, and preferably under the action of an induced air flow.

The refrigerating circuits of the fin coils, or those of the plate coils are not shown in the drawings as they are well known, and different systems may be used, such as the compressor system, absorption system, etc. Anyone skilled in the art can readily connect any such a system, with the necessary accessories to start and stop the same.. For this reason the temperature controls 30, expansion valve 31, fan motor switch 42 are shown diagrammatically in Fig. 8. Also, the temperatures set forth as the preferred temperatures in the tunnel may be varied, depending on each installation, the temperature heretofore given, being by way of example, as applicable to the best form.

I have described several forms of my invention, but obviously various changes may be made in the details disclosed without departing from the spirit of the invention as set out in the following claims.

I claim:

1. An apparatus for the cooling of heated objects, having a tunnel and means moving said objects from the entrance end to the discharge end of said tunnel, comprising a housing communicating with the interior of the tunnel, at a point substantially centrally located along the length of the tunnel, vertically superposed refrigerating fin devices arranged along opposite sides of the housing, vertically superposed refrigerating blowers, one for each device, and a plurality of ducts extending from the sides of said housing and communicating at their discharge ends with the interior of the tunnel at spaced points thereof, at both sides of said housing, said ducts having their entrance ends in communication with the interior of said housing for receiving the air from the devices and blowers.

2. An apparatus for the cooling of heated objects, having a tunnel and means moving said objects from the entrance end to the discharge end of said tunnel, comprising a housing communicating with the interior of the tunnel, at a point substantially centrally located along the length of the tunnel, vertically superposed refrigerating fin devices arranged along opposite sides of the housing, vertically superposed refrigerating blowers, one for each device, a plurality of ducts extending from the sides of said housing and communicating at their discharge ends with the interior of the tunnel at spaced points thereof, at both sides of said housing, said ducts having their entrance ends in communication with the interior of said housing for receiving the air from the devices and blowers, and a plurality of moisture absorbing devices spaced from each other and arranged in the interior of the tunnel.

3. An apparatus for the cooling of heated objects, having a tunnel and means moving said objects from the entrance end to the discharge end of said tunnel, comprising a housing communicating with the interior of the tunnel, at a point substantially centrally located along the length of the tunnel, vertically superposed refrigerating fin devices arranged along opposite sides of the housing, vertically superposed refrigerating blowers, one for each device, a plurality of ducts extending from the sides of said housing and communicating at their discharge ends with the interior of the tunnel at spaced points thereof, at both sides of said housing, said ducts having their entrance ends in communication with the interior of said housing for receiving the air from the devices and blowers, and a suction fan between the housing and tunnel for supplying the housing with the air from the interior of the tunnel.

4. An apparatus for the cooling of heated objects, having a tunnel and means moving said objects from the entrance end to the discharge end of said tunnel, comprising a housing communicating with the interior of the tunnel, at a point substantially centrally located along the length of the tunnel, vertically superposed refrigerating fin devices arranged along opposite sides of the housing, vertically superposed refrigerating blowers, one for each device, a plurality of ducts extending from the sides of said housing and communicating at their discharge ends with the interior of the tunnel at spaced points thereof, at both sides of said housing, said ducts having their entrance ends in communication with the interior of said housing for receiving the air from the devices and blowers, a suction fan between the housing and tunnel for supplying the housing with the air from the interior of the tunnel, and deflectors at the discharge ends of the ducts for directing the discharged air towards the suction fan.

5. An apparatus for the cooling of heated objects, having a tunnel and means moving said objects from the entrance end to the discharge end of said tunnel, comprising a housing communicating with the interior of the tunnel, at a point substantially centrally located along the length of the tunnel, vertically superposed refrigerating fin devices arranged along opposite sides of the housing, vertically superposed refrigerating blowers, one for each device, a plurality of ducts extending from the sides of said housing and communicating at their discharge ends with the interior of the tunnel at spaced points thereof, at both sides of said housing, said ducts having their entrance ends in communication with the interior of said housing for receiving the air from the devices and blowers, a suction fan between the housing and tunnel for supplying the housing with the air from the interior of the tunnel, and deflectors at the discharge ends of the ducts for directing the discharged air towards the suction fan, and an exhaust fan disposed at the entrance end of the tunnel in communication with the interior of the same, and disposed between said entrance end and the adjacent discharge end of the duct.

6. An apparatus for the cooling of heated objects, having a tunnel and means moving said objects from the entrance end to the discharge end of said tunnel, comprising a housing communicating with the interior of the tunnel, at a point substantially centrally located along the length of the tunnel, vertically superposed refrigerating fin devices arranged along opposite sides of the housing, vertically superposed refrigerating blowers, one for each device, a plurality of ducts extending from the sides of said housing and communicating at their discharge ends with the interior of the tunnel at spaced points thereof, at both sides of said housing, said ducts having their entrance ends in communication with the interior of said housing for receiving the air from the devices and blowers, a suction fan between the housing and tunnel for supplying the housing with the air from the interior of the tunnel, and deflectors at the discharge ends of the ducts for directing the discharged air towards the suction fan, an exhaust fan disposed at the entrance end of the tunnel in communication with the interior of the same, and disposed between said entrance end and the adjacent discharge end of the duct, and a deflector at said duct discharge end for directing part of the discharged air to the said exhaust fan.

7. An apparatus for the cooling of heated objects, having a tunnel and means moving said objects from the entrance end to the discharge end of said tunnel, comprising a housing communicating with the interior of the tunnel, at a point substantially centrally located along the length of the tunnel, vertically superposed refrigerating fin devices arranged along opposite sides of the housing, vertically superposed refrigerating blowers, one for each device, a plurality of ducts extending from the sides of said housing and communicating at their discharge ends with the interior of the tunnel at spaced points thereof, at both sides of said housing, said ducts having their entrance ends in communication with the interior of said housing for receiving the air from the devices and blowers, a plurality of moisture absorbing devices spaced from each other and arranged in the interior of the tunnel, a suction fan between the housing and tunnel for supplying the housing with the air from the interior of the tunnel, deflectors at the discharge ends of the ducts for directing the discharged air towards the suction fan, an exhaust fan disposed at the entrance end of the tunnel in communication with the interior of the same, and disposed between said entrance end and the adjacent discharge end of the duct, and a deflector at said duct discharge end for directing part of the discharged air to the said exhaust fan.

8. In an apparatus for cooling of heated confectionery articles, having a horizontal elongated tunnel with spaced moisture absorbing devices arranged in the interior of the tunnel, and means moving said objects within the tunnel from one end to the other end thereof, the combination of a suction fan disposed in communication with the interior of the tunnel for drawing air from the tunnel and subjecting the interior of the tunnel to induced air, a housing above the tunnel for receiving the discharge of said suction fan, a blower for said housing, a refrigerator for said housing, a duct communicating at one end with the housing for receiving the refrigerated air, and having its other end spaced from the housing along the tunnel and communicating with the interior of the tunnel at said spaced point for supplying refrigerated air to the interior of the tunnel while the interior of the tunnel is under induced air, means operating the blower when the temperature within the tunnel exceeds about 40° to 45° F., whereby the confectionery articles are subjected during their passage to dry cold air under combined induction and pressure action at about 40 to 45° F.

ARTHUR SCHUPP.

REFERENCES CITED

The following references are of record in the file of this patent:

UNITED STATES PATENTS

| Number | Name | Date |
|---|---|---|
| 537,522 | Becht | Apr. 16, 1895 |
| 972,511 | Crabb | Oct. 11, 1910 |
| 1,414,553 | Dempsey | May 2, 1922 |
| 1,496,651 | Bentz | June 3, 1924 |
| 1,511,256 | Bausman | Oct. 14, 1924 |
| 1,567,633 | Bausman | Dec. 29, 1925 |
| 1,624,678 | Schnnaier | Apr. 12, 1927 |
| 1,672,522 | Greer | June 5, 1928 |
| 1,680,842 | Bausman | Aug. 14, 1928 |
| 1,710,323 | Schmitt | Apr. 23, 1929 |
| 1,753,828 | Greer | Apr. 8, 1930 |
| 2,254,420 | Cleveland | Sept. 2, 1941 |